United States Patent
Okajima et al.

(10) Patent No.: US 11,452,971 B2
(45) Date of Patent: Sep. 27, 2022

(54) METHOD FOR OPERATING MEMBRANE SEPARATION DEVICE WITH HALT PROCESS

(71) Applicant: Kubota Corporation, Osaka (JP)

(72) Inventors: Yasunobu Okajima, Osaka (JP); Kimihiro Ishikawa, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 857 days.

(21) Appl. No.: 16/203,311

(22) Filed: Nov. 28, 2018

(65) Prior Publication Data

US 2019/0091632 A1 Mar. 28, 2019

Related U.S. Application Data

(63) Continuation of application No. PCT/JP2017/029621, filed on Aug. 18, 2017.

(30) Foreign Application Priority Data

Aug. 29, 2016 (JP) ................. 2016-166828

(51) Int. Cl.
 *C02F 1/00* (2006.01)
 *B01D 61/22* (2006.01)
 (Continued)

(52) U.S. Cl.
 CPC ............. *B01D 65/06* (2013.01); *B01D 61/22* (2013.01); *B01D 65/02* (2013.01); *C02F 1/008* (2013.01);
 (Continued)

(58) Field of Classification Search
 USPC ...................................................... 210/636
 See application file for complete search history.

(56) References Cited

U.S. PATENT DOCUMENTS

2007/0170106 A1 7/2007 Hackner et al.
2007/0289362 A1 12/2007 Ross et al.
(Continued)

FOREIGN PATENT DOCUMENTS

JP H04-267986 A 9/1992
JP H10-15573 A 1/1998
(Continued)

OTHER PUBLICATIONS

Extended European Search Report from European Application No. 17846162 dated Mar. 24, 2020.
Japanese Office Action from Japanese Application No. 2016-166828 dated Jun. 3, 2020.
International Search Report dated Sep. 12, 2017 from International Application No. PCT/JP2017/029621.

*Primary Examiner* — Hayden Brewster
(74) *Attorney, Agent, or Firm* — Beyer Law Group LLP (57) ABSTRACT

A method for operating a membrane separation device includes (a) setting a flow amount M(t) of permeated water and extracting the permeated water from the membrane separation device by the set flow amount M(t), and (b) temporarily stopping the extracting the permeated water, when a water level of a first water tank in which the membrane separation device is immersed, a water level of a second water tank in communication with the first tank, or a water level of a third water tank receiving overflowing water from the first water tank becomes lower than a predetermined halt water level. M(t), which is the flow amount of the permeated water during a time period t, satisfies a equation $M(t)=KQ(t-1)$, where K is a gain ($K>1$), and $Q(t-1)$ is an amount of inflow of the water-to-be-treated during a time period t−1 immediately prior to the time period t.

10 Claims, 7 Drawing Sheets

(51) Int. Cl.
  *B01D 65/06*   (2006.01)
  *B01D 65/02*   (2006.01)
  *C02F 3/12*    (2006.01)
  *C02F 1/44*    (2006.01)
  *C02F 3/30*    (2006.01)

(52) U.S. Cl.
  CPC .......... *C02F 1/44* (2013.01); *C02F 3/12* (2013.01); *C02F 3/1273* (2013.01); *B01D 2257/91* (2013.01); *B01D 2313/48* (2013.01); *B01D 2315/06* (2013.01); *B01D 2321/164* (2013.01); *B01D 2321/40* (2013.01); *B01D 2325/02* (2013.01); *C02F 3/302* (2013.01); *C02F 2209/005* (2013.01); *C02F 2209/03* (2013.01); *C02F 2209/40* (2013.01); *C02F 2209/42* (2013.01); *C02F 2303/16* (2013.01); *Y02W 10/10* (2015.05)

(56) References Cited

U.S. PATENT DOCUMENTS

2010/0300968 A1  12/2010  Liu et al.
2013/0153493 A1   6/2013  Young et al.

FOREIGN PATENT DOCUMENTS

| JP | H10-118684    |  5/1998 |
| JP | H11-156360  A |  6/1999 |
| JP | 2001-334130   | 12/2001 |
| JP | 2001-334130 A | 12/2001 |
| JP | 2004-188255   |  7/2004 |
| JP | 2004-188255 A |  7/2004 |
| JP | 2007-167827   |  7/2007 |
| JP | 2007-167827 A |  7/2007 |
| JP | 2007-526115   |  9/2007 |
| JP | 2015-231591   | 12/2015 |
| JP | 2015-231591 A | 12/2015 |

METHOD FOR OPERATING MEMBRANE SEPARATION DEVICE WITH HALT PROCESS

CLAIM OF PRIORITY

This application is a Continuation of International Patent Application No. PCT/JP2017/029621, filed on Aug. 18, 2017, which claims priority to Japanese Patent Application No. 2016-166828, filed on Aug. 29, 2016, each of which is hereby incorporated by reference.

BACKGROUND OF THE INVENTION

1. Field of the Invention

The present invention relates to a method for operating a membrane separation device and a membrane separation device.

2. Description of the Related Art

Japanese Patent Application Laid-Open No. 10-15573 discloses a wastewater treatment device adopting a membrane bioreactor process in which a membrane separation device is immersed in an aeration tank for biologically treating organic wastewater with activated sludge such that solution mixed with the activated sludge in the aeration tank is solid-liquid separated by the membrane separation device.

The wastewater treatment device includes a wastewater transfer means for transferring the organic wastewater to the aeration tank at a flow rate satisfying a daily average wastewater amount so as to efficiently perform gravity filtration, while maintaining a water level in the tank within a substantially fixed range, and a constant flow discharging means for discharging the membrane permeated liquid by an amount equivalent to the daily average wastewater amount, wherein the wastewater transporting means and the constant flow discharging means cooperate with each other.

That is, in either case of gravity filtration or suction filtration, the difference between the amount of the wastewater flowing into the aeration tank and the amount of the membrane permeated liquid being discharged from the aeration tank is adjusted such that the water level in the aeration tank in which the membrane separation device is immersed is kept constant.

In such a membrane separation device, when a transmembrane pressure (TMS) increases due to fouling substances adhered to the membrane surface as a result of filtration operation, a flow amount of permeated water per unit membrane area, i.e., a flux, decreases.

In such a case, it is necessary to stop the filtration operation and perform a relaxation process so as to clean the membrane surface with an upward flow of the water to be treated by aeration, or a cleaning process using a chemical solution such as sodium hypochlorite to remove the fouling substances from the membrane surface.

Since the filtration operation is halted by performing the relaxation process or the chemical cleaning process, conventionally, a design flux (a design value of the flux) is provided with a considerable margin so as to suppress a sudden rise of the transmembrane pressure, and such a chemical cleaning of the filtration membrane has been performed by an operator's manual operation of pumps and valves, choosing a right timing and period when the inflow of the wastewater becomes less.

In order to secure a predetermined flow amount of the permeated water with such a design flux, it is necessary to increase the membrane area, that is, to increase the number of installed membrane separation devices. As a result, the operation cost such as the power cost required for aeration and the like becomes high.

In order to reduce the operation cost of the wastewater treatment facility using such a membrane bioreactor process, it is necessary to reduce the membrane area of the membrane separation devices installed and to increase the design flux.

BRIEF DESCRIPTION OF THE INVENTION

However, if the membrane area is reduced and the design flux is increased, there is a possibility that an unexpected rapid increase in the transmembrane pressure may occur, and in such a case, it is necessary to be able to immediately perform a cleaning process of the membrane surface while maintaining the predetermined flow amount of the permeated water. That is, it is necessary to mandatorily spare the time for removing the membrane surface resistance during a normal operation.

In the light of the foregoing, it is the object of the present invention to provide a method for operating a membrane separation device and a membrane separation device which are capable of dealing with an unexpected sudden increase in the transmembrane pressure while increasing the design flux to reduce operating costs.

In order to achieve the above object, a first characteristic configuration of the method for operating the membrane separation device according to the present invention is, as described in claim 1, a method for operating a membrane separation device for performing solid-liquid separation of water to be treated via a separation membrane, wherein a flow amount $M(t)$ of permeated water from the membrane separation device satisfies a relationship expressed by the following equation: $M(t)=KQ(t-1)$, where $M(t)$ is the flow amount of the permeated water during a time period t having a predetermined length, K is a gain ($>1$), and $Q(t-1)$ is an amount of inflow of the water to be treated during a time period $t-1$ immediately prior to the time period 1. The method includes a membrane filtration process for extracting the permeated water from the membrane separation device by the set flow amount of the permeated water, and a halt process for temporarily stopping the extracting the permeated water from the membrane separation device when a water level of a first water tank in which the membrane separation device is immersed, a water level of a second water tank which is in communication with the first tank such that a water level thereof is the same as that of the first water tank, or a water level of a third water tank into which overflowing water from the first water tank is flowing, becomes lower than a predetermined halt water level.

In a second characteristic configuration of the operation method, as described in claim 2, in addition to the above-described first characteristic configuration, the halt process also temporarily stops the extracting the permeated water from the membrane separation device when a transmembrane pressure of the separation membrane becomes equal to or greater than a predetermined upper limit of an allowable value, even before the water level of any one of the first, second, and third water tanks drops to the predetermined halt water level.

In the third characteristic configuration of the operation method, as described in claim 3, in addition to the above-described first or second characteristic constitution, the halt process includes performing a relaxation step for cleaning the separation membrane with an upward flow of the water to be treated by aerating the membrane separation device.

In the fourth characteristic configuration of the operation method, as described in claim 4, in addition to the above-described first or second characteristic configuration, the halt process includes performing a chemical liquid cleaning step for cleaning the membrane separation device with a chemical solution.

In the fifth characteristic configuration of the operation method, as described in claim 5, in addition to any one of the first to fourth characteristic configurations described above, after performing the halt process, the membrane filtration process is resumed when one of the following conditions is met: the water level of the membrane separation tank is returned to a predetermined water level higher than the halt water level, a predetermined time period has elapsed, and the transmembrane pressure of the separation membrane drops to a reference value lower than the upper limit of the allowable value.

The sixth characteristic configuration of the operation method, as described in claim 6, in addition to any one of the above-mentioned first to fifth characteristic configuration, the gain K is set in a range of $1.01 < K < 1.10$.

A first characteristic configuration of the membrane separation device according to the present invention is, as described in claim 7, a membrane separation device for performing solid-liquid separation of water to be treated through a separation membrane. The membrane separation device includes a permeated water flow amount measuring section for measuring a flow amount $M(t)$ of permeated water, an inflow amount measuring section for measuring an amount of inflow $Q(t)$ of the water to be treated, and a water level measuring section for measuring a water level of a first water tank in which the membrane separation device is immersed, a water level of a second water tank which is in communication with the first water tank such that the water level thereof is the same as that of the first water tank, or a water level of a third water tank into which overflowing water from the first water tank is flowing, and a membrane filtration control section for setting the flow amount of the permeated water such that the flow amount of the permeated water satisfies a relationship expressed by the equation: $M(t)=KQ(t-1)$, where $M(t)$ is the flow amount of the permeated water during a time period t having a predetermined length, K is a gain (>1), and $Q(t-1)$ is an amount of inflow of the water to be treated during a time period t-1 immediately prior to the time period t, extracting the permeated water from the membrane separation device by the set flow amount of the permeated water, and temporarily stopping the extracting of the permeated water from the membrane separation when the water level of any one of the first, second, and third water tanks is dropped to a predetermined halt water level.

In the second characteristic configuration of the membrane separation device, as described in claim 8, in addition to the above-described first characteristic configuration, the membrane separation device further includes a transmembrane pressure measuring section for measuring a transmembrane pressure of the separation membrane, and the membrane filtration control section temporarily stops the extracting of the permeated water from the membrane separation device when the transmembrane pressure of the separation membrane becomes equal to or greater than a predetermined upper limit of an allowable value, even before the water level of any one of the first, second, and third water tanks is dropped to the predetermined halt water level.

In a third characteristic configuration of the membrane separation device, in addition to the above-described seventh or eighth characteristic configuration, the membrane filtration control section, when the extraction of the permeated water from the membrane separation device is temporarily stopped, performs a cleaning of the separation membrane with an upward flow of the water to be treated by aerating the membrane separation device, or performs a cleaning of the membrane separation device with a chemical solution.

As described above, according to the present invention, it is possible to provide an operation method of a membrane separation device and a membrane separation device which are capable of dealing with an unexpected sudden rise of the transmembrane pressure, while increasing the design flux and reducing the operation cost.

BRIEF DESCRIPTION OF THE DRAWINGS

The present invention is illustrated by way of example, and not by way of limitation, in the FIG.s of the accompanying drawings and in which like reference numerals refer to similar elements and in which.

DETAILED DESCRIPTION OF EMBODIMENTS OF THE INVENTION

Figure 1:
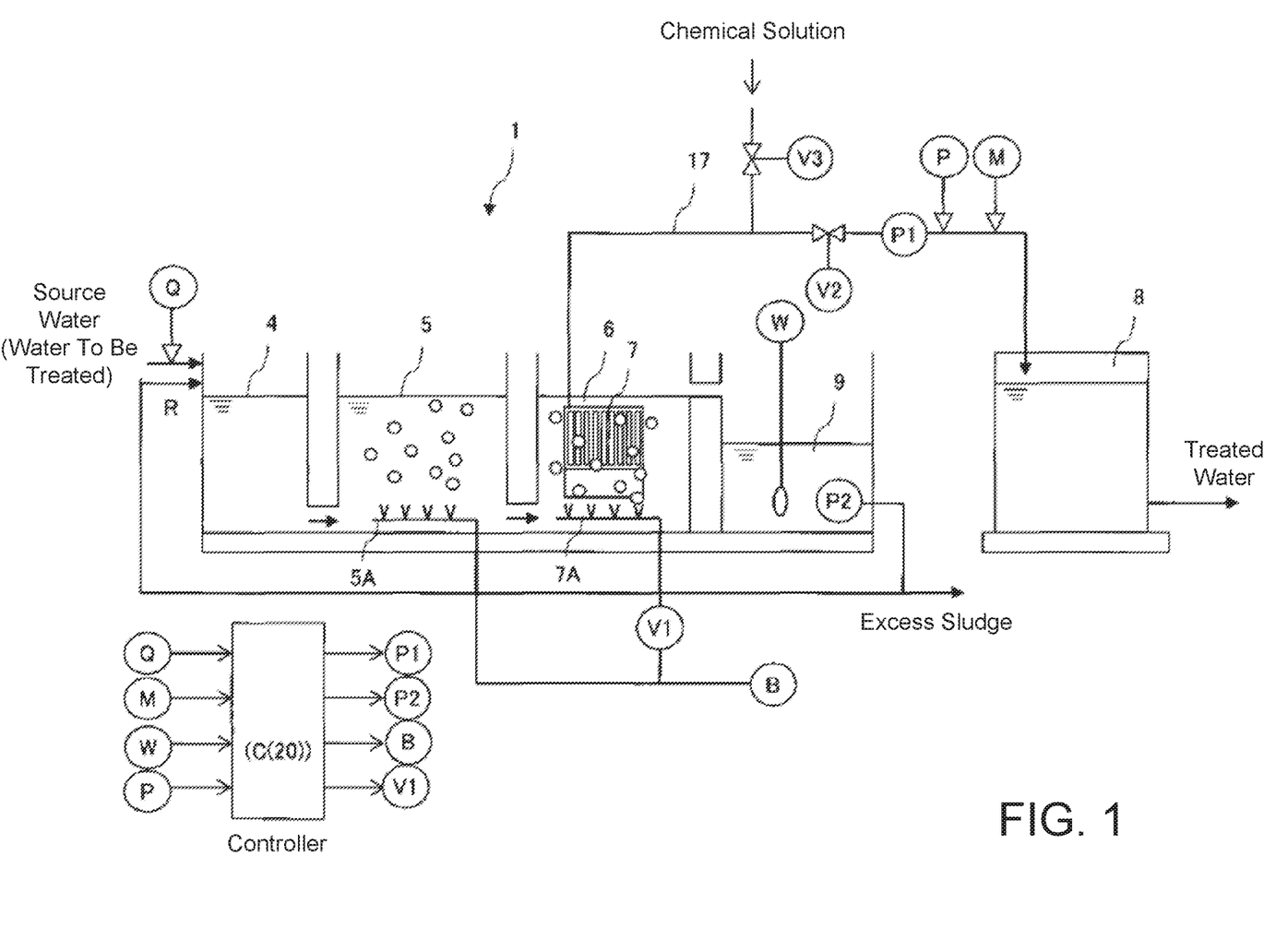
FIG. 1 is an explanatory diagram of a wastewater treatment facility in accordance with one embodiment.

Hereinafter, a method for operating a membrane separation device and a membrane separation device according to the present invention will be described. FIG. 1 illustrates an example of a wastewater treatment facility 1 incorporating a membrane separation device 7. The wastewater treatment facility 1 is provided with a biological treatment tank which includes an oxygen-free tank 4 filled with activated sludge, an aerobic tank 5 having a diffuser 5A installed at a bottom thereof, and a membrane separation tank 6, the membrane separation device 7 which is immersed in the membrane separation tank 6 and obtains permeated water from water to be treated in the membrane separation tank 6, a treated water tank 8 which receives treated water filtered by the membrane separation device 7, and an operation control device C which controls the operation state of the membrane separation device 7.

The ammoniac nitrogen contained in source water which is the water to be treated flowing into the oxygen-free tank 4 is nitrified into nitrate nitrogen in the aerobic tank 5 by the activated sludge and the organic matter is decomposed, and a solid-liquid separation is performed by the membrane separation device 7 immersed in the membrane separation tank 6 on the downstream side.

Excessive activated sludge contained in the water to be treated which overflows into a buffer tank 9 disposed adjacent to the membrane separation tank 6 is returned to the oxygen-free tank 4 together with the nitrate nitrogen contained in the water to be treated by a pump P2, which is reduced to nitrogen by denitrification and part of which is extracted and discarded. The return amount R of the activated sludge is set to about 4 times with respect to a design inflow amount QD of the source water (R=4 QD).

The permeated water which has been solid-liquid separated by the membrane separation device 7 is stored in the treated water tank 8, and then discharged to a river or the like after being treated with necessary processes such as sterilization.

Figure 2:
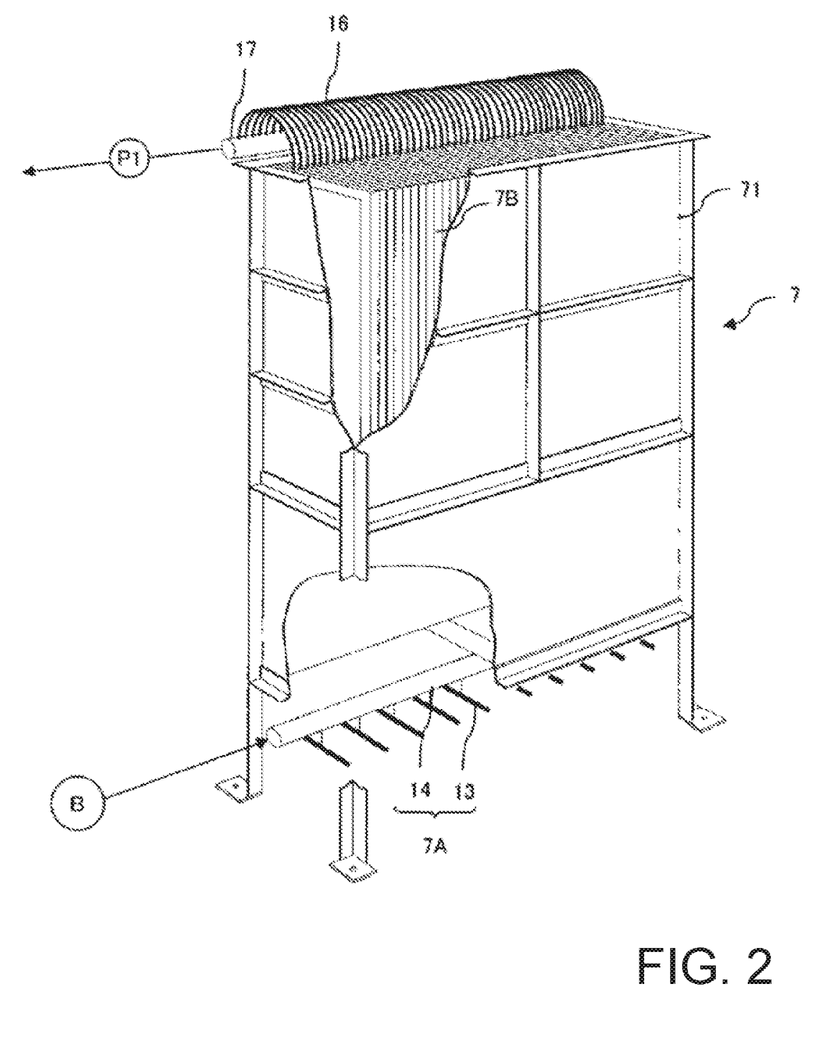
FIG. 2 is an explanatory diagram of a membrane separation device in accordance with one embodiment.

As shown in FIG. 2, the membrane separation device 7 has one hundred (100) plate-shaped membrane elements 7B arranged in a membrane case 71 having upper and lower open ends such that each membrane surface is vertically disposed and separated from one another by a constant interval about 6 mm to 10 mm (8 mm in the present embodiment). A diffuser device 7A is disposed under the membrane case 71.

The diffuser device 7A includes an diffusing tube 13 having a plurality of diffusing holes formed therein and is connected to an air supply source such as a blower B or a compressor disposed outside the tank via an air diffusing header 14 connected to the diffusing tube 13. In this embodiment, the blower B is used as the air supply source, which supplies air to a diffuser device 5A provided in the aerobic tank 5 and also to the diffuser device 7A via a valve V1. However, a respective dedicated blower may be provided for each of the diffuser device 5A and the diffuser device 7A without using the valve V1.

A pump P1 as a suction mechanism is installed outside the tank, and connected to the membrane element 7B via a water collecting pipe 17, such that the water to be treated in the tank is suction filtered by passing through the membrane surface of the membrane element 7B.

Figure 3:
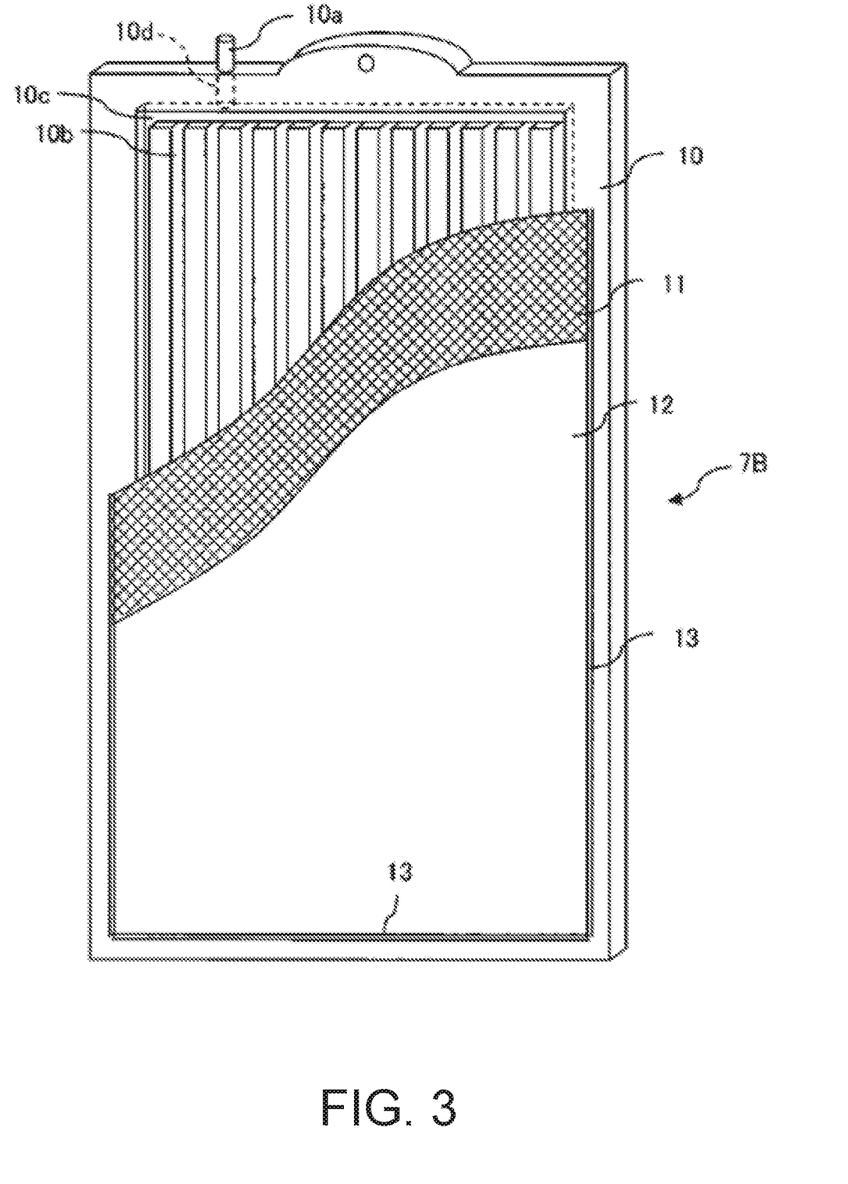
FIG. 3 is an explanatory diagram of a membrane element in accordance with one embodiment.

As shown in FIG. 3, the membrane element 7B has a separation membrane 12 disposed on both of the front and back surfaces of a resin-made membrane support body 10 having a longitudinal length of 1000 mm× a lateral width of 490 mm with a spacer 11 interposed therebetween. A peripheral edge portion 13 of the separation membrane 12 is welded to the membrane support body 10 by ultrasonic waves or heat, or is attached thereto using an adhesive or the like.

The separation membrane 12 is a microporous organic filtration membrane coated and impregnated with a porous resin in a nonwoven fabric, having an average pore diameter of about 0.2 μm. The structure of the membrane element 7B is not limited to this, but the separation membrane 12 may be wound around both of the front and back surfaces of the membrane support body 10, and an end portion of the separation membrane 12 may be bonded or welded thereto.

The surfaces of the membrane support body 10 are provided with a plurality of grooves 10b having a depth of about 2 mm and a width of about 2 mm which are formed along the longitudinal direction, and with horizontal grooves 10c formed at an upper end portion thereof and communicating with each of the longitudinal grooves 10b. The horizontal groove 10c formed on the front surface and that formed the back surface communicate with each other via a communication hole 10d and then communicate with a nozzle 10a formed at the upper edge portion of the membrane support body 10.

Each nozzle 10a is connected to a water collecting pipe 17 via a tube 16. The pump P1 as a suction mechanism is connected to the water collecting pipe 17, and the permeated water sucked by the pump P1 is transferred to the treated water tank 8 (See FIG. 2).

By operating the diffuser device 7A of the membrane separation device 7 and the suction mechanism P1 as described above, the permeated water which is permeated through the separation membrane 12 is obtained from the water to be treated.

An operation control device C has a permeated water amount measuring section M for measuring a flow amount M(t) of permeated water from the membrane separation device 7 and an inflow amount measuring section Q for measuring an amount of the inflow Q(t) of the water to be treated into the biological treatment tank 4A, a water level measuring section W for measuring a water level of the buffer tank 9, and a membrane filtration control section 20 having an arithmetic processing function.

A membrane filtration control unit 20 sets the flow amount M(t) of the permeated water such that the flow amount M(t) of the permeated water during a time period t having a predetermined length, the amount of the inflow Q(t−1) of the water to be treated during a time period t−1 immediately before the time period t, and a gain K (K>1) satisfy a relationship represented by the following equation: M(t)=KQ(t−1). The membrane filtration control unit 20 controls the pump P1 such that the permeated water is extracted from the membrane separation device 7 with the set flow amount M(t) of the permeated water, and that the extraction of the permeated water from the membrane separation device 7 is temporarily stopped when a water level WL of the buffer tank 9 drops to a predetermined halt water level LWL.

The membrane filtration control unit 20 aerates the membrane separation device 7 in a state in which the extraction of the permeated water from the membrane separation device 7 is temporarily stopped, and aerates the membrane separation device 7 so as to clean the separation membrane with an upward flow of the water to be treated, or cleans the membrane separation device 7 with a chemical solution.

When the aeration is performed by the diffuser device 7A while the pump P1 is stopped, the water to be treated rises along the separation membrane 12, during which fouling-causing substances such as metabolites of microorganisms attached to the surface of the separation membrane 12 are removed, thereby alleviating a clogging state of the separation membrane 12.

A water shutoff valve V2 is provided between the water collecting pipe 17 and the pump P1, and a chemical solution supply pipe connected to a chemical solution tank (not shown) is branched and connected to an upstream side of the water shutoff valve V2. After stopping the pump P1 and closing the water shutoff valve V2, a valve V3 is opened and the separation membrane 12 is cleaned by supplying the chemical solution from the chemical solution supply pipe to the membrane separation device 7. The chemical solution tank is filled with a chemical solution such as sodium hypochlorite.

When the chemical cleaning is finished, filtration is resumed by closing the valve V3, opening the shutoff valve V2, and driving the pump P1. A bypass pipe line for taking out the permeated water so as not to flow into the treated water tank 8 in the beginning of the filtration until the chemical solution flows out of the membrane separation device 7.

A transmembrane pressure measurement unit P that measures a transmembrane pressure of the separation membrane 12 (a pressure loss value of the membrane separation device) is further provided, and the membrane filtration control unit 20 temporarily stops the extraction of the permeated water from the membrane separation device 7 when the transmembrane pressure of the separation membrane 12 becomes equal to or greater than a predetermined upper limit of an allowed value Pu, even before the water level of the buffer tank 9 drops to the predetermined water level LWL.

Figure 4A:
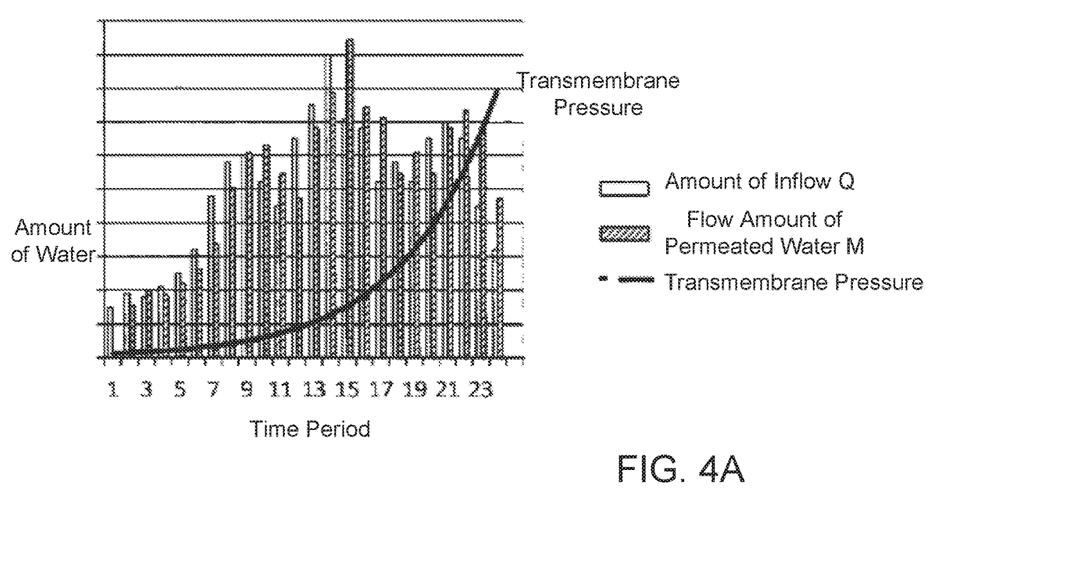
FIGS. 4A and 4B are explanatory diagrams of a method for operating a membrane separation device in accordance with one embodiment.

As shown in FIG. 4A, the inflow fluctuation is divided by the unit of one hour, and the flow amount M(t) of the permeated water is set with respect to the amount of the inflow Q(t−1) during a previous unit hour. The flow amount M(t) of the permeated water is given by K·Q(t−1).

Figure 4B:
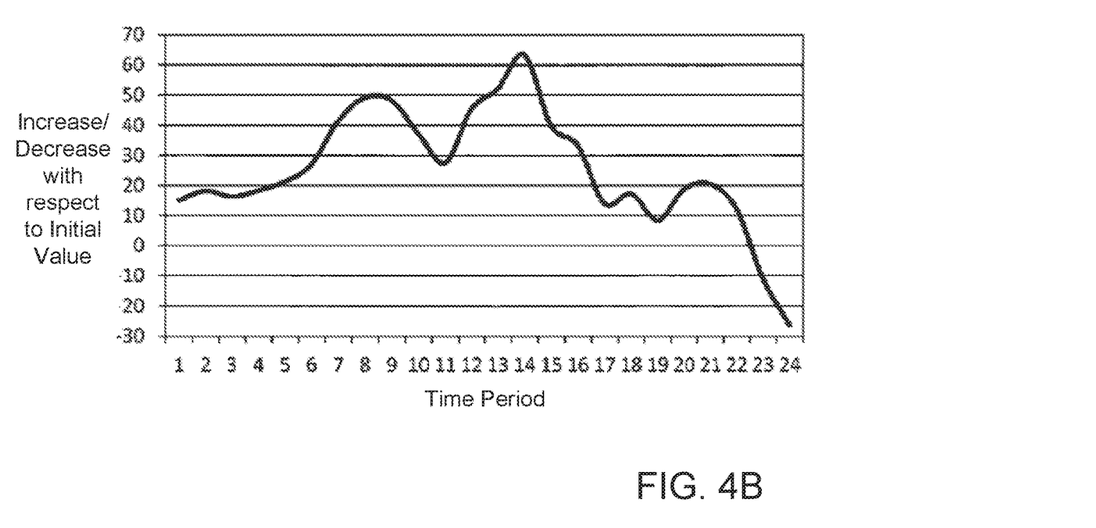

As shown in FIG. 4B, when the amount of inflow Q tends to increase, the amount of sludge held in the system tends to increase. When the amount of inflow Q tends to decrease, the amount of the sludge held in the system also tends to decrease to the point where the amount of the sludge held in the system becomes negative with respect to the initial amount of the sludge. An increase or decrease in the amount of the sludge held in the system appears as an increase or decrease in the water level of the buffer tank 9, which is detected by a water level gauge.

It is preferable that the gain K is set in a range of 1.01<K<1.10, which realizes an appropriate time balance between the membrane filtration process and the halt process, such that sufficient time for cleaning can be obtained in case where the membrane is cleaned in the halt process.

FIG. 4A shows an example in which the inflow amount Q(t) of the source water flowing into the oxygen-free tank 4 dynamically fluctuates, followed by the corresponding and delayed fluctuation in the flow amount M(t) of the permeated water from the membrane separation device 7. As membrane filtration progresses, the transmembrane pressure gradually increases.

If the design flux of the membrane separation device 7 is increased and the total number of the membrane separation devices 7 is reduced in order to reduce the operation cost, there is a risk that an unexpected sudden rise in the transmembrane pressure difference TMP will occur.

In the method for operating the wastewater treatment facility according to the present invention, the membrane filtration operation is performed in a stable state without causing a sudden increase in the transmembrane pressure difference (TMP). Hereinafter, the operation method performed by the membrane filtration control unit 20 will be described in detail.

As described above, the membrane filtration control unit 20 sets the flow amount M(t) of the permeated water from the membrane separation device during the time period t having the predetermined length, such that the relationship with respect to the amount of the inflow Q(t−1) of the water to be treated into the biological treatment tank 4 during the time period t−1 immediately prior to the time period t, and the gain K (K>1) which is expressed by the equation M(t)=KQ(t−1) is satisfied. Then, the membrane filtration control unit 20 performs the extraction step of extracting the permeated water from the membrane separation device 7 by the set flow amount of the permeated water, and the halt process of temporarily stopping the extraction of the permeated water from the membrane separation device 7 when the water level of the buffer tank 9 drops to the predetermined halt water level LWL.

As shown in the above equation, by setting the gain K greater than 1 such that the flow amount M(t) of the permeated water exhibits a delayed response to the amount of inflow Q(t) of the water to be treated, a steady state is achieved in which the amount of activated sludge in the tank gradually decreases with a lapse of time during execution of the membrane filtration process.

In such a situation, when the halt process of temporarily stopping the extraction of the permeated water from the membrane separation device 7 is performed, the water level of the buffer tank 9 gradually recovers, during which the time for cleaning the separation membrane 12 can be secured.

By increasing the design flux, it becomes possible to deal with an unexpected sudden rise in the transmembrane pressure, thereby reducing the operation cost by reducing the aeration amount or the like. In addition, by appropriately setting the halt water level LWL for performing the halt process, it becomes possible to secure the flow amount M(t) of the permeated water corresponding to the amount of inflow Q(t).

When the water level of the buffer tank 9 drops to the halt water level LWL, the membrane filtration process is switched to the halt process. In the halt process, the relaxation step of cleaning the separation membrane 12 with the upward flow of the water to be treated is performed by aerating the membrane element 7B of the membrane separation device 7 by the diffuser device 7A, whereby the transmembrane pressure is lowered and an unexpected sudden increase in the transmembrane pressure can be prevented.

In addition, by performing the chemical solution cleaning step for cleaning the membrane separation device 7 with a chemical solution in the halt process, it is possible to recover the transmembrane pressure TMP to a low value close to its initial condition, whereby the membrane filtration process can be repeatedly performed in a stable state.

Whether to perform which of the relaxation step and the chemical solution cleaning step in the halt process can be set appropriately. For example, it may be set such that the chemical solution cleaning step is selected when the transmembrane pressure of the separation membrane 12 measured by the transmembrane pressure measurement section P is equal to or greater than a predetermined threshold value, while the relaxation step is performed if the measured value is less than the predetermined threshold value.

Alternatively, it may be set such that the relaxation step is preferentially performed a predetermined number of times, and then the chemical solution cleaning step is executed in the subsequent halt process.

Figure 5A:
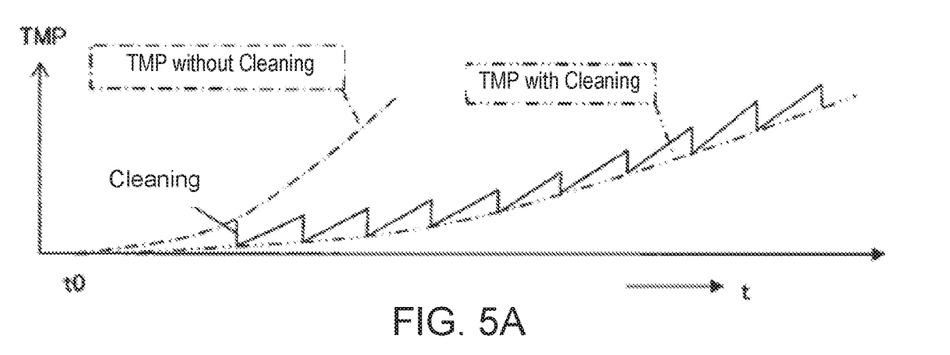
FIGS. 5A, 5B, and 5C are explanatory diagrams of a method for operating a membrane separation device in accordance with one embodiment.

FIG. 5A shows the transmembrane pressure characteristics (two-dot chain line) when the relaxation step is performed in the halt process, compared with the transmembrane pressure characteristics (dashed line) when no relaxation step is performed in the halt process. Since the separation membrane 12 is cleaned every time the relaxation step is performed in the halt process, whereby the extent of contamination is reduced such that the increase in the transmembrane pressure becomes gentle and thus the membrane separation can be performed stably for a long period of time. Similar transmembrane pressure characteristics can be obtained by performing the chemical solution cleaning step with a low concentration chemical solution instead of performing the relaxation step.

Figure 5B:
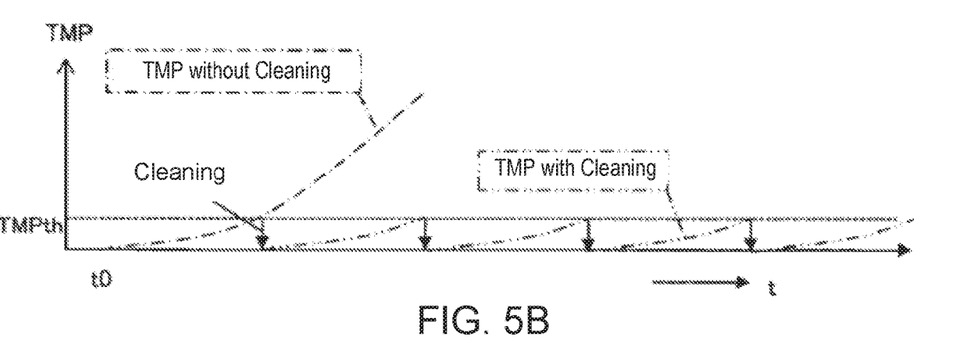

FIG. 5B shows the transmembrane pressure characteristics (two-dot chain line) when the chemical solution cleaning step is performed using a high concentration chemical solution in the halt process, compared with the transmembrane pressure characteristics (dashed line) when no cleaning step is performed in the halt process. Since the separation membrane 12 is cleaned to the initial condition thereof every time when the chemical solution cleaning step is executed in the halt process if the transmembrane pressure becomes greater than the threshold value, the increase in the transmembrane pressure is prevented and thus the membrane separation can be performed in a stable state for a long period of time. It should be noted that the chemical solution cleaning step may be regularly performed irrespective of the threshold value.

Figure 5C:
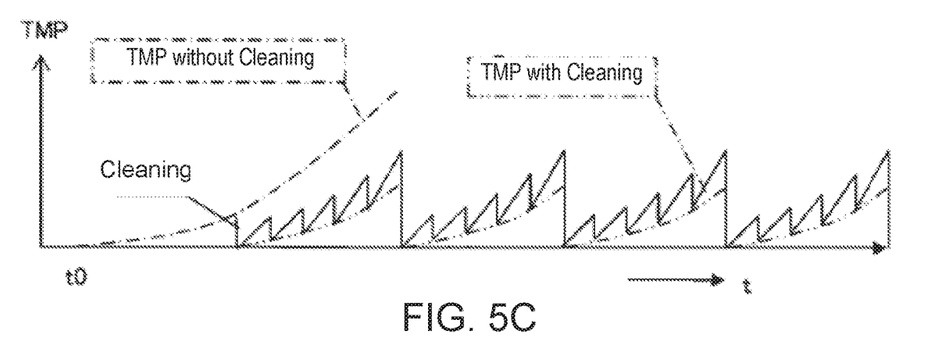

FIG. 5C shows the transmembrane pressure characteristics (two-dot chain line) when the relaxation step and the chemical solution cleaning step are combined, compared with the transmembrane pressure characteristics (one point Dashed line) when neither relaxation step nor cleaning step is performed in the halt process. After the relaxation step is performed in the halt process for a plurality of times, the chemical solution cleaning step is performed. In this way, by combining the relaxation step and the chemical solution cleaning step, it becomes possible to stably perform the membrane separation over a long period of time.

Furthermore, it is also possible to change the concentration of the chemical solution used in the chemical solution cleaning step. For example, a low concentration of the chemical solution may be used in the chemical solution cleaning step in the halt process up to a predetermined number of times, and then a high concentration chemical solution is used in the chemical solution cleaning step thereafter, which can be repeated. In this case, transmembrane pressure characteristics similar to that in FIG. 5C are obtained.

When the transmembrane pressure of the separation membrane 12 becomes equal to or greater than the predetermined upper limit of the allowable value, it is preferable to perform the halt process for temporality stopping the extraction of the permeated water from the membrane separation device 7, even before the water level of the buffer tank 9 drops to the predetermined halt water level LWL.

Even when the water level of the buffer tank 9 is equal to or higher than the predetermined water level, when the transmembrane pressure of the separation membrane 12 becomes equal to or greater than the upper limit of the allowable value, the halt process is performed so as to provide an opportunity to clean the separation membrane 12, which allows to countermeasure an emergency situation.

It is preferable to return to the membrane filtration process when any one of the following conditions is satisfied after performing the halt process: the water level of the buffer tank 9 is restored to a predetermined water level NWL higher than the halt water level; a predetermined time period Δt elapses; or the transmembrane pressure of the separation membrane 12 is decreased to a reference value lower than the upper limit of the allowable value.

If the membrane filtration process is resumed when the water level of the buffer tank 9 returns to the predetermined water level higher than the halt water level, an idle operation of the pump P2 can be avoided. If the membrane filtration process is resumed after the predetermined time period elapses, the membrane can be stably cleaned during that time period. If the membrane filtration process is resumed when the transmembrane pressure of the separation membrane returns to the reference value lower than the upper limit of the allowable value, a reliable cleaning of the membrane can be achieved.

While in the example shown in FIG. 1, the buffer tank 9 is provided adjacent to the membrane separation tank 6, if the membrane separation tank 6 is not provided with the buffer tank 9, it is preferable that the membrane filtration process is resumed when the water level thereof is restored to a predetermined water level higher than the halt water level.

Figure 6:
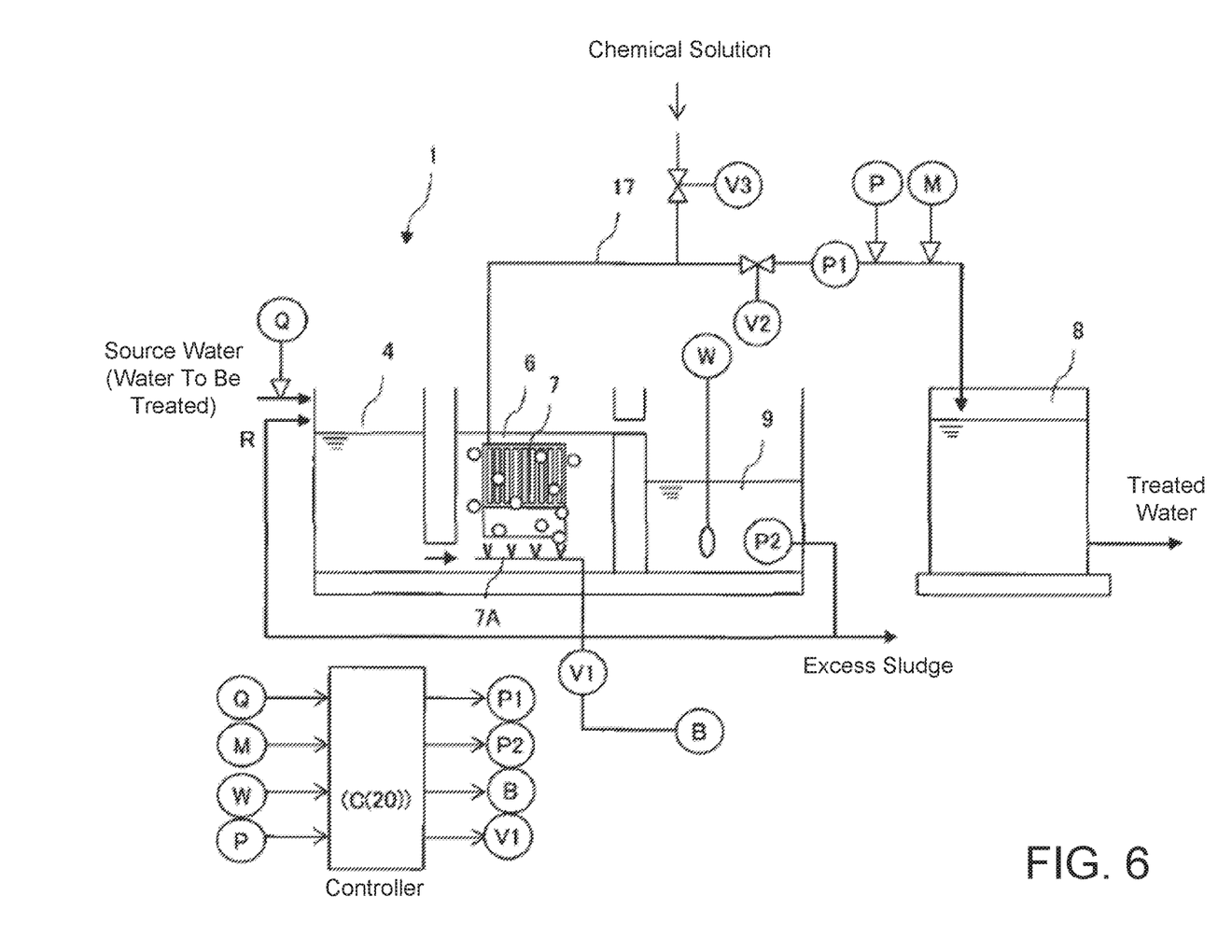
FIG. 6 is an explanatory diagram of a wastewater treatment facility according to another embodiment.

FIG. 6 illustrates a wastewater treatment facility according to another embodiment. The above-described embodiment has explained the wastewater treatment facility including the aerobic tank 5 having the diffuser device 5A installed on the bottom thereof, and the membrane separation tank 6 having the membrane separation device 7 immersed therein. However, the aerobic tank 5 and the membrane separation tank 6 may be combined such that the aerobic treatment and the membrane separation treatment can be realized in the same treatment tank.

Figure 7:
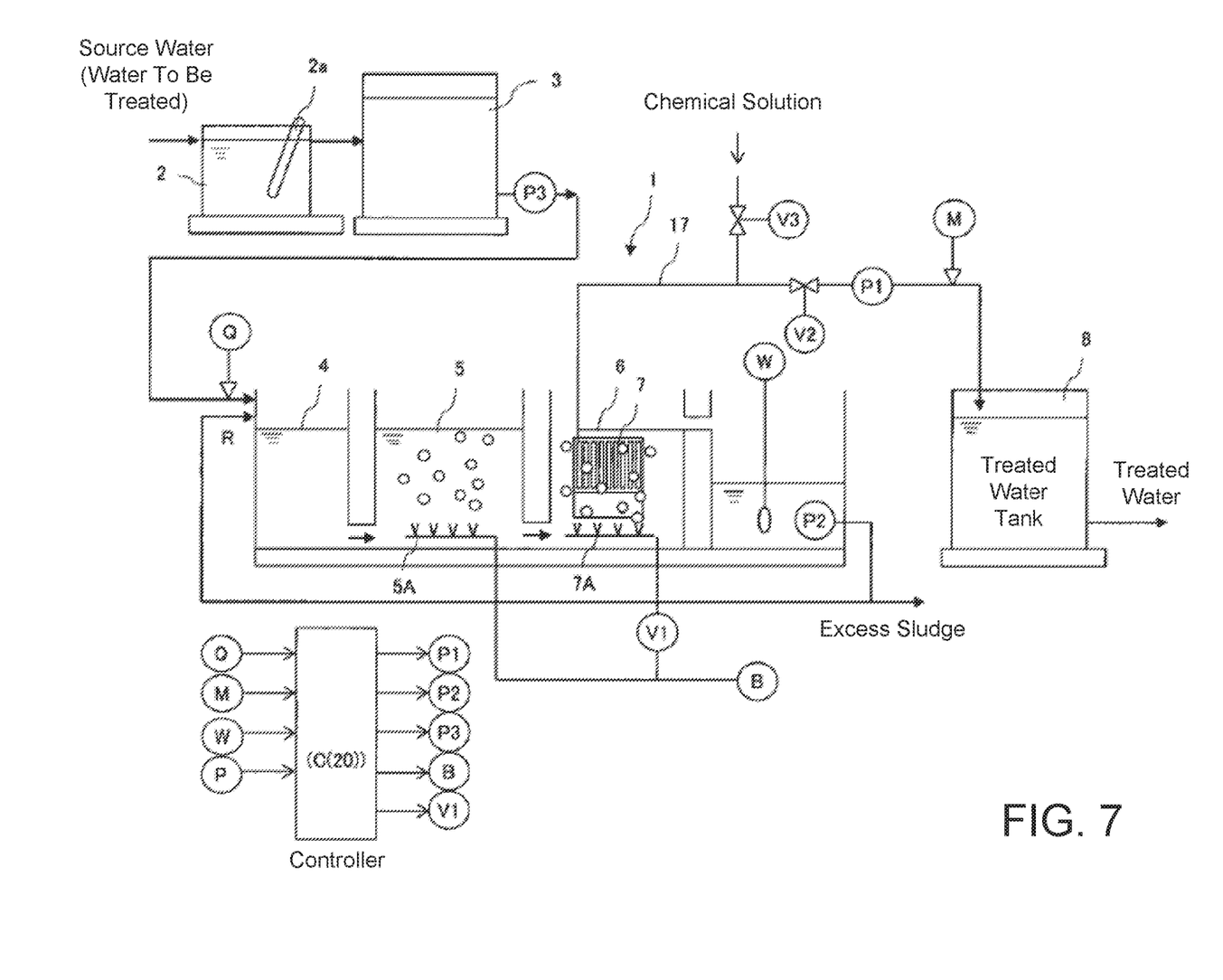
FIG. 7 is an explanatory diagram of a wastewater treatment facility according to yet another embodiment.

FIG. 7 illustrates a wastewater treatment facility according to yet another embodiment. The above-described embodiment has explained the example in which the source water directly flows into the oxygen-free tank 4 which is part of the activated sludge treatment tank on the upper stream side. However, it is possible to further provide a pretreatment tank 2 having a bar screen 2a or the like for removing impurities mixed in the source water, and a flow rate adjustment tank 3 for temporarily storing the water to be treated from which impurities have been removed by the bar screen 2a or the like. A flow rate adjustment mechanism P3 such as a pump and a valve allows to stably supply the water to be treated from the flow rate adjustment tank 3 into the activated sludge treatment tank 4 even when the amount of the inflow of the source water fluctuates.

The above-described embodiment has explained the example having a single line of the activated sludge treatment tank including the oxygen-free tank 4, the aerobic tank 5, and the membrane separation tank 6. However, the present invention is also applicable to such a wastewater facility provided with a plurality of lines of the activated sludge treatment tanks arranged in parallel. In such a case, it is not necessary for each line of the activated sludge treatment tanks to synchronously perform the membrane filtration process and the halt process, and each line of the activated sludge treatment tanks can independently perform the membrane filtration process and the halt process.

In this case, each line may include a respective operation control device C, or only the membrane filtration control unit 20 may be shared among the lines.

The above-described embodiment is one embodiment of the present invention, and the present invention is not limited by the above description, and the specific configuration and control mode of each section can be appropriately modified within the range where the operation and effect of the present invention is exerted.

What is claimed is:

1. A method for operating a membrane separation device for performing solid-liquid separation of water to be treated via a separation membrane, the method comprising:
a membrane filtration process including:
setting a flow amount M(t) of permeated water from the membrane separation device so as to satisfy a relationship expressed by the following equation: M(t)= KQ(t−1), where M(t) is the flow amount s f the permeated water during a time period t having a predetermined length, K is a gain (>1), and Q(t−1) is an amount of inflow of the water to be treated during a time period t−1 immediately prior to the time period t; and
extracting the permeated water from the membrane separation device by the set flow amount M(t) of the permeated water; and a halt process including:
    temporarily stopping extracting the permeated water from the membrane separation device when a water level of a first water tank in which the membrane separation device is immersed, a water level of a second water tank which is in communication with the first water tank such that the water level thereof is the same as that of the first water tank, or a water level of a third water tank into which overflowing water from the first water tank is flowing, becomes lower than a predetermined halt water level.

2. The method for operating the met brane separation device according to claim 1, wherein the halt process further includes:
    temporarily stopping extracting the permeated water from the membrane separation device when a transmembrane pressure of the separation membrane becomes equal to or greater than a predetermined upper limit of a range of allowable values, even before the water level of any one of the first, second, and third water tanks drops to the predetermined halt water level.

3. The method for operating the membrane separation device according to claim 2, wherein, after performing the halt process, the membrane filtration process resumed when one of the following conditions is met:
    the water level of the first, second, or third tank which was detected in the halt process returns to a predetermined water level higher than the predetermined halt water level;
    a predetermined time has elapsed; and
    the transmembrane pressure of the separation membrane drops to a reference value lower than the predetermined upper limit of the range of allowable values.

4. The method for operating the membrane separation device according to claim 1, wherein the halt process further includes:
    performing a relaxation step for cleaning the separation membrane with an upward flow of the water to be treated by aerating the membrane separation device.

5. The method for operating the membrane separation device according to claim 1, wherein the halt process further includes:
    performing a chemical liquid cleaning step for cleaning the membrane separation device with a chemical solution.

6. The method for operating the membrane separation device according to claim 1, wherein, after performing the halt process, the membrane filtration process is resumed when one of the following conditions is met:
    the water level of the first, second, or third tank which was detected in the halt process returns to a predetermined water level higher than the halt water level; and
    a predetermined time has elapsed.

7. The method for operating the membrane separation device according to claim 1, wherein the gain K is set in a range of $1.01 < K < 1.10$.

8. The method for operating the membrane separation device according to claim 1, wherein extracting the permeated water from the membrane separation device by the set flow amount $M(t)=KQ(t-1)$ gradually decreases contents of the third water tank during execution of the membrane filtration process.

9. The method for operating the membrane separation device according to claim 1, wherein extracting the permeated water from the membrane separation device by the set flow amount $M(t)=KQ(t-1)$ provides a delayed response of the flow amount of the permeated water to the amount of inflow of the water to be treated.

10. A method for operating a membrane separation device for performing solid-liquid separation of water to be treated via a separation membrane, the method comprising:
    a membrane filtration process including:
        setting a flow amount $M(t)$ of permeated water from the membrane separation device so as to satisfy a relationship expressed by the following equation: $M(t) =KQ(t-1)$, where $M(t)$ is the flow amount of the permeated water during a time period t having a predetermined length, K is a gain (>1), and $Q(t-1)$ is an amount of inflow of the water to be treated during a time period t−1 immediately prior to the time period t; and
        extracting the permeated water from the membrane separation device by the set flow amount $M(t)$ of the permeated water, the membrane separation device being immersed in a first water tank; and
    a halt process including:
        temporarily stopping extracting the permeated water from the membrane separation device when a water level of a tank into which overflowing water from the first water tank is flowing becomes lower than a predetermined halt water level.

* * * * *